United States Patent [19]

Nakano et al.

[11] Patent Number: 4,841,290
[45] Date of Patent: Jun. 20, 1989

[54] DISPLAY UNIT

[75] Inventors: Masaaki Nakano; Syoyu Watanabe; Yusaku Saito; Syuji Iwata, all of Hyogo, Japan

[73] Assignee: Mitsubishi Denki Kabushiki Kaisha, Tokyo, Japan

[21] Appl. No.: 101,032

[22] Filed: Sep. 25, 1987

[30] Foreign Application Priority Data

Sep. 25, 1986 [JP] Japan .................. 226767

[51] Int. Cl.$^4$ .............................. G06K 9/16
[52] U.S. Cl. .................. 340/707; 340/706; 340/712; 178/19
[58] Field of Search ............ 340/365 P, 706, 707, 340/708, 709, 815.3, 711, 712; 350/332, 333; 178/18, 19

[56] References Cited

U.S. PATENT DOCUMENTS

| | | | |
|---|---|---|---|
| 3,530,241 | 9/1970 | Ellis | 178/18 |
| 3,674,928 | 7/1972 | Yoshiyama et al. | |
| 4,117,471 | 9/1978 | Schlig et al. | 340/708 |
| 4,471,162 | 9/1984 | Aono et al. | 178/18 |

FOREIGN PATENT DOCUMENTS

| | | |
|---|---|---|
| DE2850960 | 5/1979 | Fed. Rep. of Germany . |
| DE3533869 | 3/1986 | Fed. Rep. of Germany . |
| 0043619 | 6/1979 | Japan .................. 340/707 |
| 0157339 | 9/1982 | Japan . |

OTHER PUBLICATIONS

Nakano et al., IEEE Transactions on Consumer Electronics, vol. CE-33, No. 3, Aug. 1987, pp. 367-374.

Primary Examiner—Donald J. Yusko
Assistant Examiner—Alvin Oberley
Attorney, Agent, or Firm—Sughrue, Mion, Zinn, Macpeak & Seas

[57] ABSTRACT

In a display unit comprising a plate-shaped display panel with X-Y matrix electrodes consisting of two groups of electrodes, X-axis electrodes and Y-axis electrodes, display signals are applied to the X-Y matrix electrodes, a.c. current is applied to at least one group of electrodes one after another, and the phase of the a.c. current is compared with that of the output of an input pen having means for detecting the magnetic flux induced by the a.c. current, so that the position of the input pen on the display panel is detected from the result of the comparison.

2 Claims, 5 Drawing Sheets

| DF TERMINAL | INTERNAL SHIFT RESISTER DATA Di | DRIVER OUTPUT Oi |
|---|---|---|
| L | L | V2 |
| L | H | V4 |
| H | L | V3 |
| H | H | V1 |

DISPLAY UNIT

BACKGROUND OF THE INVENTION

This invention relates to a display unit for an electronic computer, and more particularly to a display unit serving as interactive means between an operator and an electronic computer whose planar display panel can be used as a coordinate input surface.

A display unit with a data inputting function whose planar display panel can be used to input coordinates has been disclosed by Japanese Patent Application Laid-Open No. 31127/81. The conventional data input type display unit is as shown in FIG. 6.

In FIG. 6, reference numeral 400 designates a liquid crystal panel; 500, a transparent touch panel switch; and 600, a controller. FIG. 7 is a sectional view of the transparent touch panel switch 500. In FIG. 7, reference numeral 501 designates an upper transparent film substrate; 502, belt-shaped X-axis transparent electrodes laid on the upper transparent film substrate 501 in such a manner that they are in parallel with one another; 503, a lower transparent film substrate; 504, belt-shaped Y-axis transparent electrodes laid on the lower transparent film substrate 503 in such a manner that they are in parallel with one another and perpendicular to the X-axis transparent electrodes 502; and 505, a spacer in the form of a transparent sheet having holes at the intersections of the X-axis transparent electrodes 502 and the Y-axis transparent electrodes 504.

The operation of the display unit thus constructed will be described. An operation of displaying images on the liquid crystal panel 400 is carried out in the conventional manner. The transparent touch panel switch 500 operates as follows: When the operator touches the surface of the transparent touch panel switch 500 with his finger or a writing pen, the X-axis transparent electrode 502 and the Y-axis transparent electrode 504 are brought into contact with each other through the hole of the spacer 505 at the part of the surface of the panel switch 500 which has been touched by the operator. Under this condition, the controller 600 scans all the X-axis transparent electrodes 502 and all the Y-axis transparent electrodes 504 of the transparent touch panel switch 500 to detect conduction or nonconduction at the intersections of the X-axis and Y-axis transparent electrodes 502 and 504, thereby to detect the position on the surface of the liquid crystal panel 400 which has been indicated with the finger or writing pen.

The conventional display unit described above suffers from the following difficulties: The display unit is so designed that the image displayed on the liquid crystal panel is observed through the transparent touch panel, and therefore the display quality is lowered as much. This difficulty may be overcome by increasing the resolution of the transparent touch panel switch substantially to that of picture elements displayed. However, employment of the method results in increasing the manufacturing cost of the display unit, and gives rise to another problem that the transparent touch panel switch and the liquid crystal panel must be accurately aligned with each other in display dot position.

SUMMARY OF THE INVENTION

Accordingly, an object of this invention is to eliminate the above-described difficulties accompanying a conventional display unit with a data inputting function.

More specifically, an object of the invention is to provide a display unit having a data inputting function which is high in display quality, low in manufacturing cost and high in position detection accuracy.

The foregoing object and other objects of the invention have been achieved by the provision of a display unit which, according to the invention, comprises: a flat-plate-shaped display panel having X-Y matrix electrodes consisting of two groups of electrodes which are arranged in matrix form; displaying-signal applying means for applying displaying signals to the X-Y matrix electrodes; current applying means for applying a current having a.c. components to at least one group of electrodes in such a manner that the current flows in the electrodes one after another; an input pen with magnetic flux detecting means; phase comparison means for comparing the phase of the current applied to the electrodes with that of the output signal of the magnetic flux detecting means; and position detecting means for detecting the position of the input pen on the display panel according to the output signal of the phase comparison means.

A display unit according to the present invention can function in a display mode and a position detecting mode in accordance with the kind of the signal applied to the matrix electrodes. When an a.c. current is applied to the matrix electrodes successively in the position detecting mode, the phases of the signals outputted from the magnetic flux detecting means included in the pen are different in phase between a case in which the current is applied to one group of the electrodes and a case in which the current is applied to the other group of the electrodes with the position of the pen having the magnetic flux detecting means as a boundary. Accordingly, the position of the magnetic flux detecting means can be detected by detecting the point of the phase change.

The nature, principle and utility of the invention will become more apparent from the following detailed description when read in conjunction with the accompanying drawings, in which like parts are designated by like reference numerals or characters.

DETAILED DESCRIPTION OF THE PREFERRED EMBODIMENTS

Figure 1:
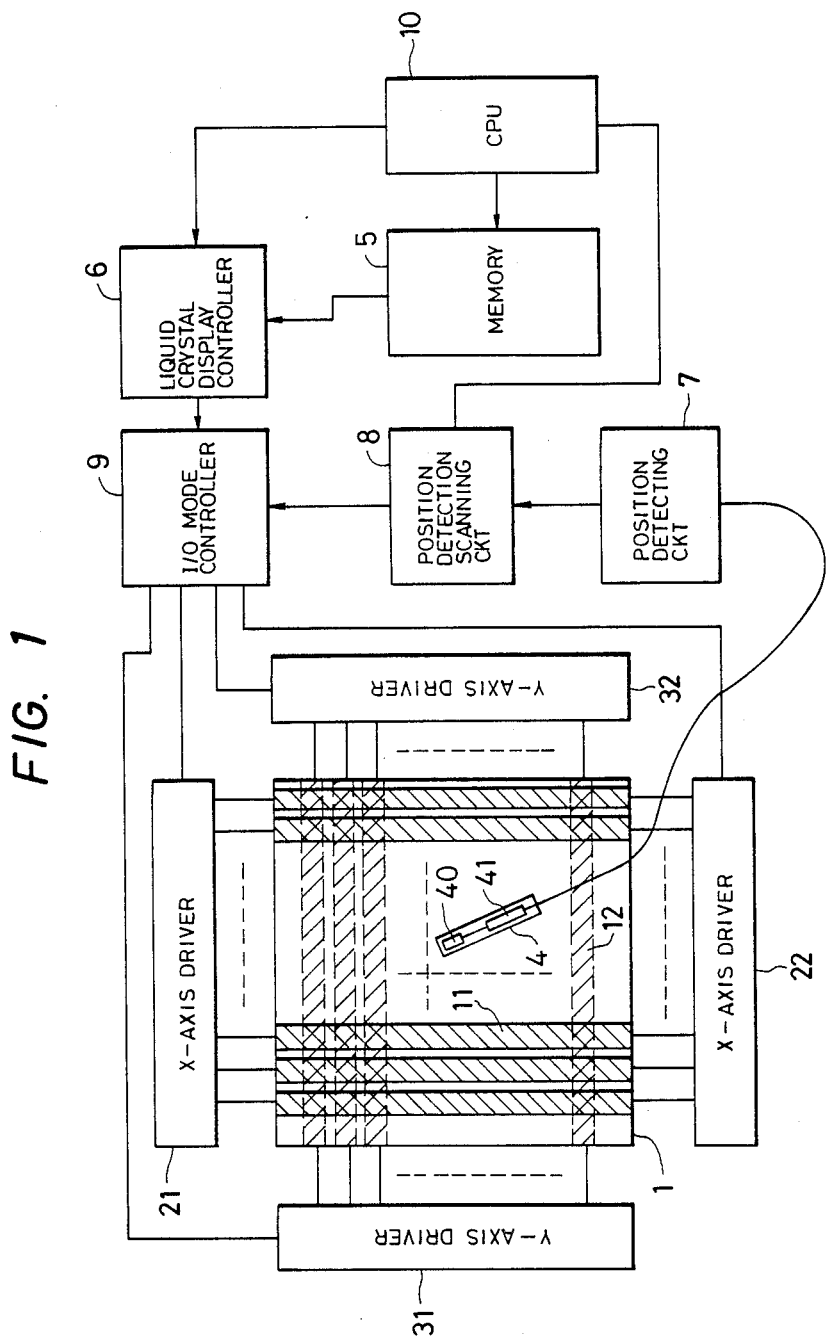
FIG. 1 is an explanatory diagram, partly as a block diagram, showing the arrangement of one example of a display unit according to this invention.

A display unit according to this invention, as shown in FIG. 1, comprises: a TN mode display liquid crystal cell 1 (planar display panel) made up of belt-shaped X-axis transparent electrodes 11 and belt-shaped Y-axis transparent electrodes 12 which are arranged perpendicular to each other and are driven through their ends by signals; X-axis drivers 21 and 22; Y-axis drivers 31 and 32; an input pen 4 made up of a pickup coil wound on a ferrite core, and a head amplifier 41; a memory 5 for storing a pattern to be displayed on the liquid crystal cell 1; and a liquid crystal display controller 6 for reading out of the memory 5 pattern data in the X-axis direction which correspond to the Y-axis transparent electrodes 12 selected, and transferring them to the X-axis drivers 21 and 22.

The display further comprises; a position detecting circuit 7 which outputs a detection signal in response to the output signal of the inputting pen 4; a position detection scanning circuit 8; and an input/output mode controller 9 operating as switching means for applying display data and control signals provided by the liquid crystal controller 6 to the X-axis drivers 21 and 22 and the Y-axis drivers 31 and 32 in a display mode, and applying signals provided by the position detection scanning circuit 8 to the X-axis drivers 21 and 22 and the Y-axis drivers 31 and 32 in a position detection mode. In FIG. 1, reference numeral 10 designates a CPU (central processing unit) for controlling the operation of the display unit, for instance writing display patterns in the memory 5.

Figure 2:
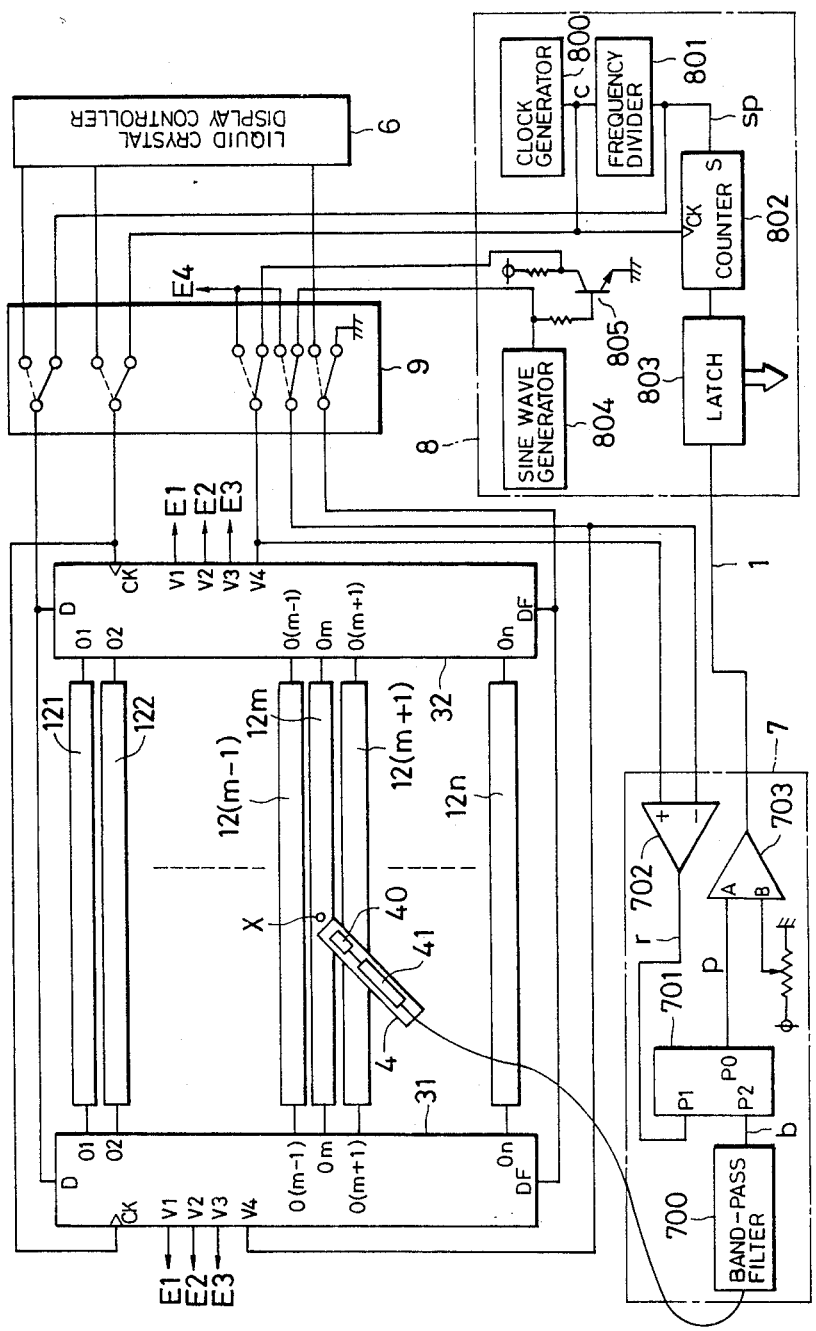
FIG. 2 is an explanatory diagram, partly as a block diagram, for a description of the position detecting operation of the display unit according to the invention.

FIG. 2 shows the arrangement of the display unit in the position detection mode in more detail. In FIG. 2, reference numeral 800 designates a clock generator whose output terminal is connected to the clock input terminals CK of the Y-axis drivers 31 and 32 through the input/output mode controller 9, and to the input terminal of a frequency divider 801 and to the clock input terminal CK of a counter 802. The output terminal of the frequency divider 801 is connected to the data input terminals D of the Y-axis drivers 31 and 32, and to the start terminal S of the counter 802. Further in FIG. 2, reference numeral 803 designates a latch circuit for latching the output of the counter 802 with the aid of a latch pulse (l); 804, a sine wave generator for generating a sine wave having a frequency $f_0$; and 805, a emitter-grounded transistor for producing a sine wave which is different by 180° in phase from the output sine wave of the sine wave generator 804.

Further in FIG. 2, reference numeral 700 designates a band-pass filter with a central frequency $f_0$; 701, a phase comparator in which the phase difference between sine waves applied respectively to its input terminals P1 and P2 is provided, as a voltage level, at the output terminal PO; 702, a differential amplifier; and 703, a comparator which outputs a coincidence pulse when the output of the phase comparator reaches a predetermined level.

Figures 3, 4:
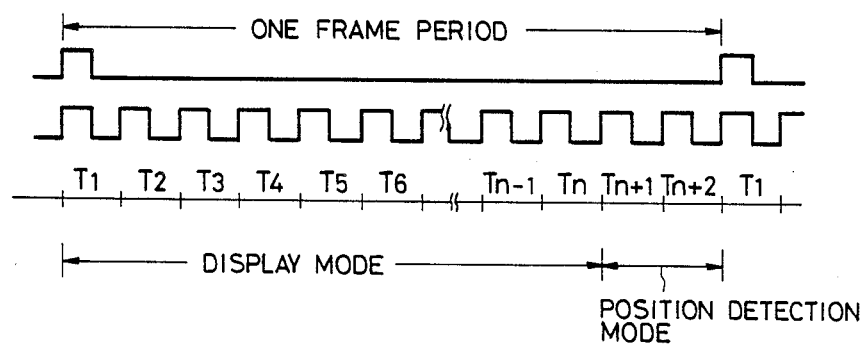
FIG. 3 is a diagram showing the truth table of Y-axis drivers in FIG. 2.
FIG. 4 is a diagram for a description of the time division for a display mode and a position detection mode in the display unit of the invention.

Each of the Y-axis drivers 31 and 32 is the same Y-axis driver as that shown in FIG. 1 and has a shift register of n stages, so that data applied to the data input terminal D is successively shifted in response to the clock pulse applied to the clock input terminal CK. In the driver, according to data Di (i=1 through n) in the shift register and a value provided at a switching terminal DF, one of the voltages applied to voltage application terminals V1, V2, V3 and V4 is provided at an output terminal Oi (i=1 through n). The truth table of the output voltages is as indicated in FIG. 3. Predetermined DC voltages E1, E2 and E3 are applied to the voltage application terminals V1, V2 and V3, respectively. A DC voltage E4 is applied to the terminals V4 through the input/output mode controller 9 in the display mode, and the two sine wave voltages different by 180° in phase from each other are applied to the terminals V4 in the position detection mode, respectively.

The internal switches in the input/output mode controller 9 are connected as indicated in FIG. 2 by the broken lines in the display mode, and as indicated by the solid line in the position detection mode.

FIG. 2 shows the Y-axis drivers 31 and 32, and the Y-axis transparent electrodes $12_1$ through $12_n$. However, it goes without saying that the X-axis drivers and the X-axis transparent electrodes are arranged perpendicular to the Y-axis drivers and the Y-axis transparent electrodes, and in the position detection mode they operate in the same manner as the Y-axis drivers and the Y-axis transparent electrodes.

The operation of the display unit thus organized will be described.

In the display unit of the invention, the display mode and the position detection mode occurs alternatively with a predetermined period (or in time division manner). More specifically, as shown in FIG. 4, one frame period is divided into (n+2) periods $T_1$ through $T_{n+2}$, and the periods $T_1$ through $T_n$ are used for the display mode, and the remaining periods $T_{n+1}$ and $T_{n+2}$ for the position detection mode.

In the display mode, the internal switches of the input/output mode controller 9 are connected as indicated by the broken lines in FIG. 2, and the liquid crystal displayed controller 6 reads the data on a pattern to be displayed from the memory 5, so that the display is performed in the voltage averaging drive method well known in the art. The DC voltages E1, E2, E3, and E4 are provided as bias voltages suitable for the voltage averaging drive method, and the selected voltage is applied to the Y-axis electrode transparent electrodes $12_1$ through $12_n$ respectively for the periods $T_1$ through $T_n$ in the stated order, and to the X-axis transparent electrode 11 selected for every period. In this operation, the same voltage is outputted by the drivers provided on both sides of the X-axis transparent electrodes 11 or the Y-axis transparent electrodes 12.

Now, the position detection mode will be described with reference to FIG. 5. In the period $T_{n+1}$, the internal switches of the input/output mode controller 9 are connected as indicated by the solid lines, and the y-distance of the position of the input pen 4 is detected.

In the position detection mode, the sine wave voltage Vm sin $(2\pi f_0 t)$ generated by the sine wave generator 804, and a sine wave voltage $-$Vm sin $(2\pi f_0 t)$ which is obtained by shifting the phase of the sine wave voltage Vm sin $(2\pi f_0 t)$ by 180° using the transistor 805 are applied to the terminal V4 of the Y-axis driver 31 and the terminal V4 of the Y-axis driver 32, respectively. As the terminals DF of the Y-axis drivers 31 and 32 are grounded, the output terminals Oi (i=1 through n) of the Y-axis driver 31 and 32 provide the DC voltage E2 when the data in the shift registers is at "L" (logical low level), and the sine wave voltage Vm sin $(2\pi f_0 t)$ and $-$Vm sin $(2\pi f_0 t)$ when at "H" (logical high level).

Figure 5:
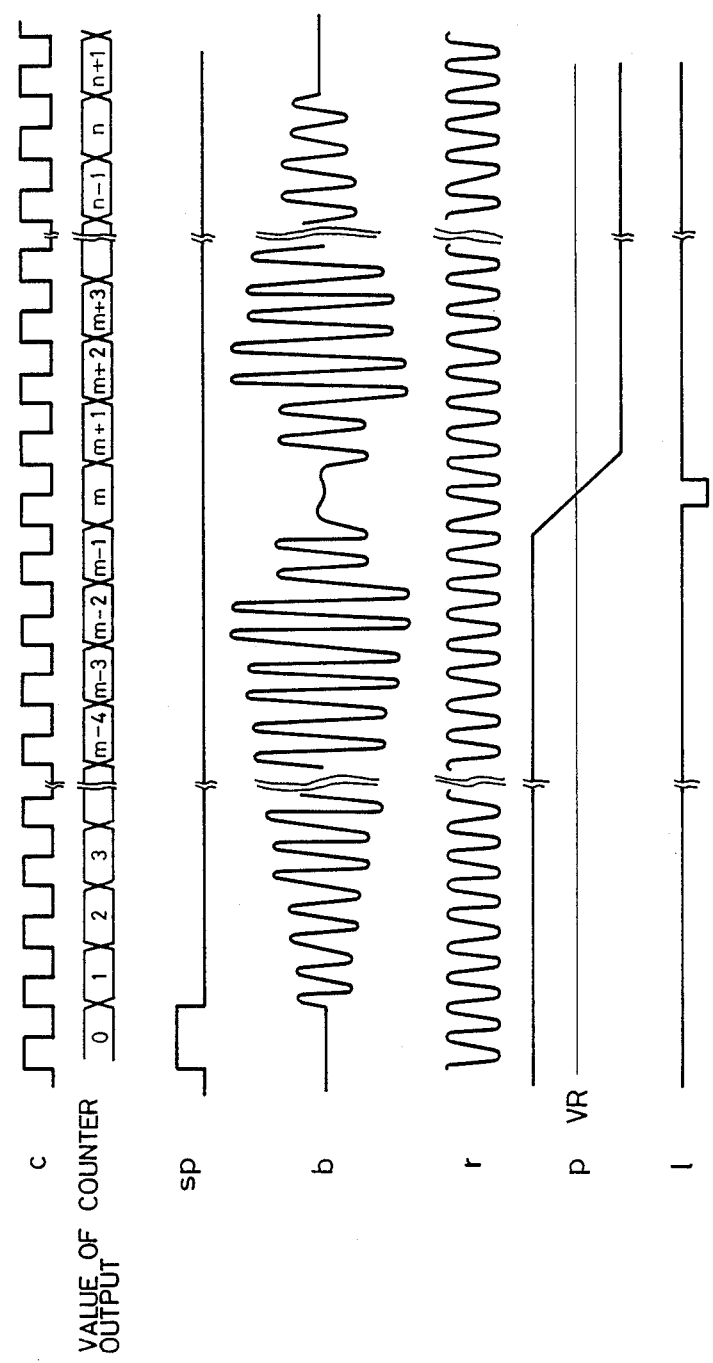
FIG. 5 is a time chart showing essential output signals in the circuit of FIG. 2.
Figure 6:
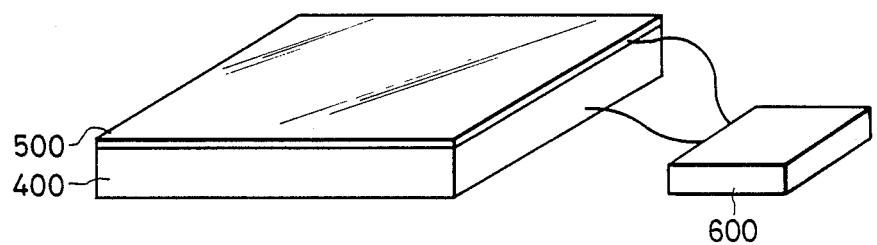
FIG. 6 is an external view of a conventional display unit having a data inputting function.
Figure 7:
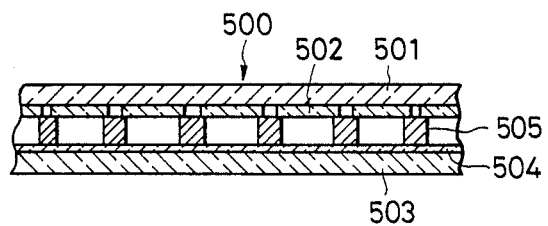
FIG. 7 is a sectional view of a transparent touch panel switch in the conventional display unit of FIG. 7.

A fundamental clock pulse C (FIG. 5) produced by the clock generator 800 is applied to the frequency divider 801, where it is subjected to 1/(n+2) frequency division, to provide a start pulse SP (FIG. 5). The start pulse SP is applied to the counter 802 to reset the content of the counter 802 and to start the latter 802. The start pulse SP is further applied to the data input terminals D of the shift registers in the Y-axis drivers 31 and 32. Whenever the fundamental clock pulse C is produced, the output value of the counter 802 is increased by one "1", and in synchronization with this, the data in the shift registers of the Y-axis drivers 31 and 32 are shifted by one stage, as a result of which the next Y-axis transparent electrode 12 is applied with the voltages $\pm V_m \sin(2\pi f_0 t)$. In other words, a sine wave current $(2V_m/R_0) \sin(2\pi f_0 y)$ is applied to the Y-axis transparent electrodes $12_1$ through $12_n$ successively.

In this operation, of the AC magnetic flux formed by the sine wave current flowing in the transparent electrode 12, the component which is perpendicular to the surface of the liquid crystal cell 1 induces an electromotive force in the pickup coil 40 of the input pen 4 which has been placed at the position X on the Y-axis transparent electrode $12_m$. The electromotive force thus induced is the sine wave which is equal in frequency to and different in phase by 90° from the sine wave current flowing in the Y-axis transparent electrode and whose level is inversely proportional to the distance between the point X and the Y-axis transparent electrode 12 in which the sine wave current is flowing. In the case when the current flows in the Y-axis transparent electrode $12_m$ having the point X, the distance is the shortest and the component of the magnetic flux which is perpendicular to the surface of the liquid crystal cell is substantially zero, and therefore the output of the pickup coil 40 is also substantially zero. The output signal of the pickup coil 40 is amplified by the head amplifier 41, and is then applied to the band-pass filter 700 having the center frequency $f_0$ to increase the S/N ratio. When the current is applied to the Y-axis transparent electrodes 12 one after another as was described above, the output of the band-pass filter 700 is as indicated at b in FIG. 5.

The sine wave voltages $\pm V_m \sin(2\pi f_0 t)$, which are applied to the terminals $V_4$ of the Y-axis drivers 31 and 32, respectively, are applied to the two input terminals of the differential amplifier 702, so that the latter 702 outputs a sine wave r (FIG. 5) proportional to the current flowing in the Y-axis transparent electrode 12.

As is apparent from FIG. 5, the output signal b of the band-pass filter 700 provided for the period of time in which the current flows in the Y-axis transparent electrodes $12_1$ through $12_m$ successively is different in phase by 180° from that of the band-pass filter provided from the period of time in which the current flows in the Y-axis transparent electrodes $12_{(m+1)}$ through $12_n$. Therefore, when the output signal r of the differential amplifier 702 and the output signal b of the band-pass filter 700 are applied to the phase comparator 701, the latter 701 provides an output signal p as indicated at p in FIG. 5. When the level of the output signal p of the phase comparator 701 reaches a value VR which is the potential provided at the reference potential terminal B of the comparator 703, the latter 703 provides the coincidence pulse 1, and the latch circuit 803 latches the output of the counter 802 at that time.

In other words, when the m-th Y-axis transparent electrode $12_m$, on which the input pen 4 is positioned, is scanned with the AC current, the comparator 703 outputs the coincidence pulse, and the latch circuit latches the output value m of the counter 802. The CPU 10 reads the output value of the latch 803, to detect the y-distance of the position of the input pen 4.

The above-described operations are carried out in the period $T_{n+1}$ in FIG. 4. In the following period $T_{n+2}$, the same operations are performed with respect to X-axis drivers 21 and 22 and the X-axis transparent electrodes 11, to detect the x-distance of the input pen 4.

As is apparent from the above-description, the image displaying function and the position detecting function have been combined together according to the invention. That is, the display unit having the data inputting function has been provided merely by adding the simple circuit instead of an intricate device to the display device.

In the above-described embodiment of the invention, the liquid crystal panel is employed. However, the technical concept of the invention is applicable, with the same effects, to a plasma display panel, an electroluminescence display panel, or an electronic chromic display panel. Furthermore, the current flowing in the transparent electrodes may be of a triangular wave or saw tooth wave.

As was described above, the display unit of the invention is so designed that the AC current is applied to the electrodes of the planar display device which are arranged in matrix form, and the position detection is carried out according to the variation in phase of the output signal of the input pen which detects the magnetic flux formed by the current flowing in the electrodes. Therefore, the display unit according to the invention can be manufactured at relatively low cost, and can stably detect and output coordinates with high positional accuracy with respect to display picture elements.

What is claimed is:

1. A display unit with position detecting capabilities, said display unit comprising:
    a flat-plate-shaped display panel having X-Y matrix electrodes consisting of two groups of electrodes which are arranged in a crossed-grid fashion to cover a major portion of said display panel;
    display-signal applying means for applying display signals to said X-Y matrix electrodes;
    current applying means for applying a current having a.c. components to at least one group of said X-Y matrix electrodes in such a manner that said current is sequentially applied to respective one of said electrodes in said at least one group, in a predetermined sequential order;
    an input pen with magnetic flux detecting means for detecting magnetic flux associated with a current flowing in an electrode at a matrix location where said input pen is applied;
    phase comparison means for comparing a phase of said current applied to said electrodes with that of an output signal of said magnetic flux detecting means; and
    position detecting means for detecting the position of said input pen on said display panel according to an output signal of said phase comparison means.

2. A display unit as claimed in claim 1, further comprising:
    driver means having a first driver connected to first ends of a selected group of electrodes and having a second driver connected to opposite ends of said selected group of electrodes; and
    wherein said current applying means, in a display mode, causes said first and second drivers to output said display signals at the same voltage at said first and opposite ends of an electrode, and, in a position detection mode, causes said first and second drivers at said first and opposite ends of a selected one of said electrodes to output sine wave voltages different by 180° in phase from each other.

* * * * *